Figure 1:
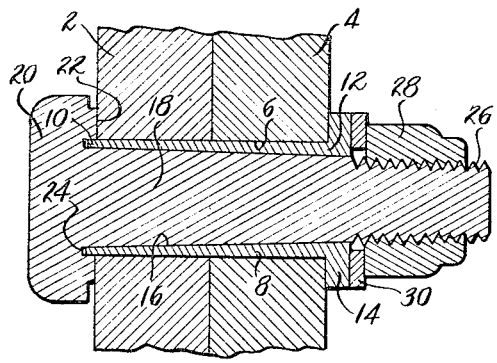

Sept. 6, 1966    B. M. ANDERSON    3,271,058
TAPERED FASTENER
Filed May 22, 1963

INVENTOR
Ben M. Anderson
BY Bacon & Thomas
ATTORNEYS

United States Patent Office 3,271,058
Patented Sept. 6, 1966

3,271,058
TAPERED FASTENER
Ben M. Anderson, Houston, Tex., assignor to Anderson, Greenwood & Company, Houston, Tex., a corporation of Texas
Filed May 22, 1963, Ser. No. 282,360
8 Claims. (Cl. 287—189.36)

This invention relates to fasteners for holding structural members together and particularly to a fastener adapted to be passsed through aligned openings in the members and tightly clamped therein.

In many fields it is necessary to fasten structural members, such as sheet or plates of metal, together to form as strong a joint as possible. It is also often essential that the total weight of the structure be kept to a minimum, for instance in the aircraft industry or the like and thus, the thickness of plates or sheets fastened together must be held to a minimum and the weight and number of fastening elements must be as small as possible. It thus becomes necessary for the fasteners to function with the utmost efficiency.

It has long been known that a fastener of the rivet or bolt type, to produce the strongest possible joint, must fit the openings through the members very snugly and preferably tight enough to actually stress the walls of the openings. Obviously, the greatest possible strength is achieved when the fastener engages the walls of the opening throughout its entire periphery and throughout the full length of the opening. Such results are difficult to achieve, however, due to the impracticability of forming the sheets or plates to precise thicknesses and in forming the openings therethrough to precise dimensions. It is further impracticable to manufacture the fastening elements so precisely that the required tight fit is always insured.

Many attempts have been made to solve the above problems, one of which comprises a fastening element having a cylindrical shank normally of slightly greater diameter than the opening and which is force-fitted therein in an effort to insure intimate pressure contact throughout. However, due to normal discrepancies in the size of the openings and the fasteners, the results were not uniform. Another attempt was to provide a sleeve readily receivable in the opening and a tapered draw pin to be pulled through the sleeve to expand the same radially into tight engagement with the walls of the opening. However, the length of the sleeve became critical in that to obtain maximum efficiency the length of the sleeve had to be exactly equal to the thickness of the assembled structural members, that is, exactly equal to the length of the opening. If bearing could not be achieved throughout the entire area of the wall of the opening or if the sleeve were too long, sufficient radial expansion could not be achieved.

Applicant's invention solves the problems and takes into account the normal differences in dimensions of materials and compensates for those differences to achieve a joint of maximum strength without necessitating extreme precision in forming the fastener or in forming openings through the structural members.

In general, applicant employs an expandable sleeve dimentioned to be readily received within the opening but of a length which may be slightly greater than the length of that opening. The sleeve is provided with a tapered interior and cooperates with a tapered draw pin so that the latter may be forced into the sleeve to expand the same radially. The draw pin is provided with a head adapted to be drawn into tight bearing engagement with a bearing surface on the outside of one of the structural members and an annular recess is provided in that head adjacent the tapered shank thereof so that the projecting portion of the outer sleeve may enter the recess to varying degrees, depending upon the thickness of the parts being assembled. It is contemplated that suitable holding means be provided for locking the draw pin the sleeve to hold the latter in its expanded condition.

It is, therefore, an object of this invention to provide a fastener comprising an expandable sleeve and a tapered draw pin to expand the same into full and complete surface contact with the walls of the opening irrespective of minor differences in dimensions of the fasteners or the parts being joined.

It is another object to provide a fastener of the type set forth wherein the sleeve is normally longer than the opening in which it is received and wherein the draw pin is provided with a recess to accommodate the projecting end of the sleeve.

Still another object is to provide a fastener achieving the above objectives which is adapted for use with either exposed or flush head fasteners.

A further object is to provide a fastener as set forth useable with any of a multiplicity of locking or holding means.

Additional and further objects and advantages will become apparent to those skilled in the art as the description proceeds with reference to the accompanying drawings wherein:

FIGS. 1 through 6, inclusive, each illustrate different modifications of a fastener embodying the principles of the present invention.

In the drawings, the same reference numerals are used throughout to indicate structural members 2 and 4, which are herein illustrated as metal plates to be fastened together in abutting relation.

Referring first to FIG. 1, the structural members 2 and 4 are provided with aligned bores defining an opening 6 therethrough. Preferably, the opening 6 is of circular sectional shape but may be of other outlines within the scope of the invention. A sleeve 8 of expandable material, preferably metal, is dimensioned to be readily received within the opening 6 without the exertion of undue pressure. Preferably, the sleeve is normally freely slidable in the opening 6 and, as shown, is of a greater length than the opening so that its ends project from opposite sides of the assembly of members 2 and 4. One end of the sleeve is indicated at 10 whereas the other end 12 is provided with a laterally extending flange-like head 14 bearing against the outer face of the plate 4. The interior surface 16 of the sleeve 8 tapers uniformly from the one end 10 to the other end 12 and through the head 14, but at a very slight angle.

A draw pin is provided with a tapered shank 18 complementary to the tapered opening 16 and having a head 20 thereon. The head 20 is provided with a bearing surface 22, which in this modification is a planar surface extending perpendicular of the axis of shank 18 for bearing engagement with the outer surface of member 2. An annular recess 24 is formed in the head 20 around the shank 18 and in position to receive the one projecting end 10 of sleeve 8. The recess 24 is preferably of a depth slightly greater than the length of the projecting portion 10 of the sleeve 8 so as to accommodate the projecting portion in the event either of the plates 2 or 4 may be slightly thinner than shown. Obviously, either of the plates could be somewhat thicker than shown and the portion 10 would still project into the recess 24, but to a lesser degree. The radial inner surface of the recess 24 is shown as a tapered continuation of the external surface of shank 18 but it is to be understood that it may be larger than illustrated and need not define such a continuation of the shank surface, as long as it is of a dimension and in proper position to receive the projecting end 10 of the sleeve.

In the modification shown in FIG. 1, the shank 18 projects a substantial distance outwardly from the other end 12 of sleeve 8 and is provided with external threads 26 on which a nut 28 is threaded. Preferably, a washer 30 is positioned between the nut 28 and the flange-like head 14 whereupon the nut may be turned to forcibly draw the shank 18 to the right until the surface 22 of head 20 bears against the plate 2. The sleeve 8 and the shank 18 are so dimensioned that drawing of the shank to the position described results in substantial radial expansion of the sleeve 8 to force it into tight pressure contact with the wall of the opening 6 throughout the entire periphery thereof and throughout the complete length thereof. Thus, a joint of the maximum possible strength is provided.

In FIGS. 2, 3, 4 and 6, the fastener shown is identical in all material respects to that described with reference to FIG. 1 except for the means for drawing and holding the shank 18 in its seated position.

Figure 2:
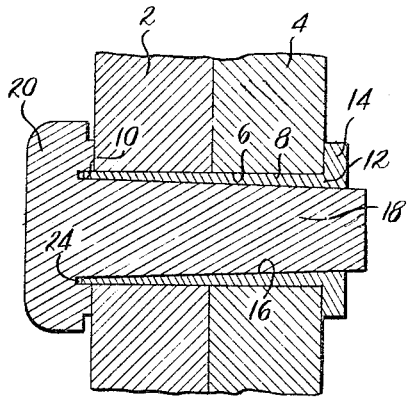

In the form of FIG. 2, the draw pin may be forced into the position shown and will normally be retained by frictional forces and the joint thus formed will be of maximum strength. However, the fastener of this modification is preferably not used in any environment where it will be subjected to substantial vibrations.

Figure 3:
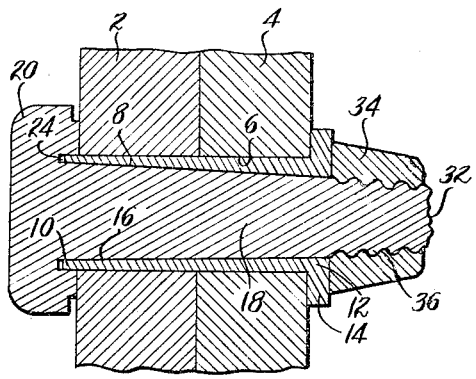

In the modification of FIG. 3, the draw pin shank 18 was originally of greater length than shown but was provided with a weakened portion in the region of the broken end 32. A pulling tool of known form was applied to the extending end of the shank and by which the shank was drawn into the seated position shown whereupon a swaging portion of the tool compressed the member 34 into the corrugations 36 to lock the draw pin in position. After the member 34 was upset or swaged to its locking position, additional tension on the extending portion of the draw pin resulted in rupture thereof at the weakened area 32. This type of fastener setting and holding means is known to the art and need not be further described.

Figure 4:
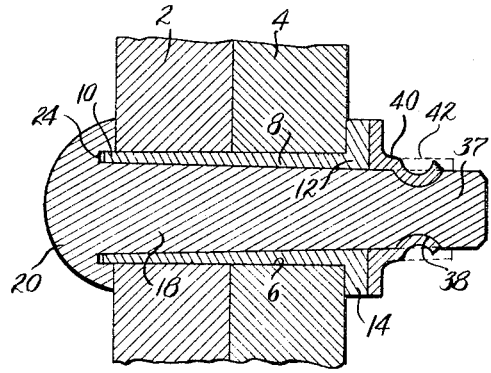

The modification of FIG. 4 differs from the previous modifications only in the locking means illustrated. In this modification an extended portion 37 of the shank 18 is provided with an annular depression 38 into which a flanged sleeve member 40 has been spun to lock the fastener in position. Dotted lines 42 indicate the original shape of a portion of the sleeve member 40 before it was upset into the recess 38. It will be obvious to those skilled in the art that the member 40 locks the shank 18 against withdrawal from the sleeve 8.

Figure 6:
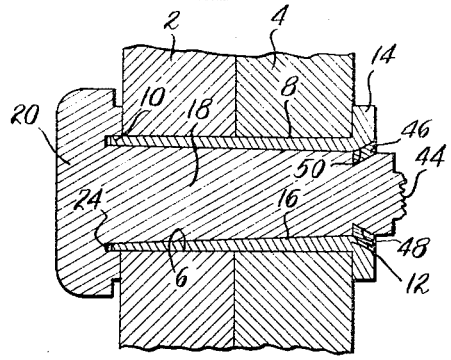

The modification of FIG. 6 is somewhat similar to that of FIG. 3 in that the shank 18 was forcibly drawn into the sleeve 8 by a pulling tool which eventually ruptured the shank at the weakened area 44 after having forced a ring 46 into a tapered or conical space 48 defined by a circumferential groove in the shank 18. In this form a portion of the flange-like head 14 is bevelled as at 50 to define a portion of the conical groove 48. This form of locking means is also known in the art and need not be further described.

Figure 5:
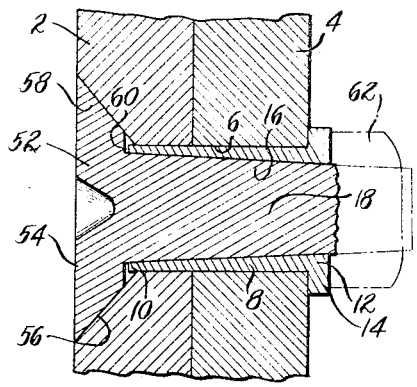

In all of the modifications thus far described, the draw pin is provided with a head, which in the finished joint projects outwardly from the structural member 2. FIG. 5 shows the invention adapted to a flush head fastener wherein the draw pin is provided with a head 52 having a flat outer surface 54 and a bearing surface 56 engageable with a complementary bearing surface 58 formed in plate 2. The opening 6 in this form, is not as long as in the previous embodiments but bearing throughout the length thereof is achieved by forming the sleeve 8 of such length as to project past the bearing surface 58 into a recess 60 formed in the head 52, similar to the recess 24 previously described. The dotted line showing at 62 merely indicates that any suitable form of holding or locking means may be employed, for example, the locking means of any of the previously described embodiments.

While a limited number of specific embodiments of the invention have been shown and described herein, it is to be understood that the same are merely illustrative of the principles involved and that other forms may be resorted to within the scope of the appended claims.

I claim:
1. A fastener comprising: a hollow sleeve having an outer surface shaped to conform generally to an opening through workpieces to be joined; the interior of said sleeve tapering uniformly from one end to the other; a draw pin member having a shank with an external surface tapered complementary to the tapered interior of said sleeve; a head on the large end of said shank, having a generally transverse bearing surface adjacent said shank; and a recess in said head circumscribing said shank and of a size and shape to receive the said one end of said sleeve.

2. A fastener as defined in claim 1 wherein said sleeve is provided with a flange-like outwardly extending head at its said other end.

3. A fastener as defined in claim 2 wherein the length of said shank is greater than the length of said sleeve; and securing means engageable with the end of said shank, opposite said head, and with said flange-like head to lock said shank in said sleeve.

4. A fastener as defined in claim 1 wherein the radially inner surface of said recess is a tapered continuation of said external surface of said shank.

5. A fastener as defined in claim 1 wherein said generally transverse bearing surface is planar and lies in a plane substantially perpendicular to the axis of said shank.

6. A fastener as defined in claim 1 wherein said head has an outer flat surface substantially perpendicular to the axis of said shank and wherein said generally transverse bearing surface is a conical surface, having an obtuse cone angle and tapering from said outer flat surface inwardly toward said shank.

7. A structural joint comprising: at least two structural members in abutting relation; an opening extending through both said members; a sleeve extending through said opening and having a head portion at one end bearing against the outer surface of one of said structural members around said opening, said sleeve being normally freely slidable in said opening and the interior thereof tapering from the other end through said one end and said head portion; the outer surface of the other structural member defining a bearing surface around said opening; a draw pin having a head and a shank, said head bearing on said bearing surface and said shank being tapered complementary to said interior of said sleeve and being wedged therein with sufficient force to hold said sleeve in radially expanded condition so that its outer surface engages the inner surface of said opening with substantial pressure throughout its entire periphery; said head on said draw pin having an annular recess around said shank; said other end of said sleeve extending beyond the adjacent end of said opening and into said recess whereby its outer surface bears against the inner surface of said opening throughout the entire length thereof.

8. A joint as defined in claim 7 including means engaging said shank and said head portion of said sleeve and locking said shank against withdrawal from said sleeve.

References Cited by the Examiner
UNITED STATES PATENTS

| | | | |
|---|---|---|---|
| 980,823 | 1/1911 | Nicols | 85—4 |
| 1,584,711 | 5/1926 | Astrom | 287—189.36 |
| 2,250,343 | 7/1941 | Zigler | 287—189.36 |
| 2,915,934 | 12/1959 | La Torre | 151—19 X |

RICHARD W. COOKE, JR., *Primary Examiner.*